United States Patent [19]

Melchior et al.

[11] 4,004,414
[45] Jan. 25, 1977

[54] COMBUSTION CHAMBER FOR SUPERCHARGED INTERNAL COMBUSTION ENGINE

[75] Inventors: Jean Melchior; Thierry Andre, both of Paris, France

[73] Assignee: The Franch State, Paris, France

[22] Filed: Nov. 25, 1974

[21] Appl. No.: 526,821

[30] Foreign Application Priority Data

Dec. 4, 1973 France .............. 73.43112

[52] U.S. Cl. .............. 60/39.65; 60/39.74 R; 60/606

[51] Int. Cl.² ............ F02C 1/00; F02G 1/00; F02G 3/00

[58] Field of Search ......... 60/39.65, 599, 606, 60/607, 619, 39.74

[56] References Cited

UNITED STATES PATENTS

| | | | |
|---|---|---|---|
| 2,620,621 | 12/1952 | Nettel | 60/599 |
| 3,096,615 | 7/1963 | Zuhn | 60/599 |
| 3,099,910 | 8/1963 | Schirmer | 60/39.65 |
| 3,447,317 | 6/1969 | Dakin | 60/39.65 |
| 3,512,359 | 5/1970 | Pierce | 60/39.65 |
| 3,589,127 | 6/1971 | Kenworthy | 60/39.65 |
| 3,688,495 | 9/1972 | Fehler et al. | 60/39.74 R |
| 3,736,752 | 6/1973 | Melchior | 60/39.65 |
| 3,774,851 | 11/1973 | Simmons | 60/39.74 R |
| 3,826,078 | 7/1974 | Quigg | 60/39.65 |
| 3,834,159 | 9/1974 | Vdoviak | 60/39.65 |
| 3,849,988 | 11/1974 | Melchior | 60/606 |
| 3,859,787 | 1/1975 | Anderson et al. | 60/39.65 |
| 3,890,088 | 6/1975 | Ferri | 60/39.65 |
| 3,913,314 | 10/1975 | Yannone et al. | 60/39.74 R |
| 3,921,403 | 11/1975 | McInerney et al. | 60/606 |

Primary Examiner—Charles J. Myhre
Assistant Examiner—Paul Devinsky
Attorney, Agent, or Firm—Barnes, Kisselle, Raisch & Choate

[57] ABSTRACT

An auxiliary combustion chamber for use with a supercharged Diesel engine comprises a fuel injection and spraying device adapted to operate with delivery rates which are variable within a broad range. The device has a fuel injection port which opens into the chamber. The size of the port is such that the fuel is mechanically atomized when injected at the maximum rate. Air passage nozzles open into the combustion chamber at a location close to the port and deliver air jets at a speed and at a delivery rate sufficient for it to atomize the fuel effectively at minimum fuel delivery rate.

23 Claims, 6 Drawing Figures

COMBUSTION CHAMBER FOR SUPERCHARGED INTERNAL COMBUSTION ENGINE

The invention relates to combustion chambers and notably to those usable as auxiliary combustion chambers in a power plant comprising an internal combustion engine, notably a Diesel engine, and a supercharging system for this engine with a turbocompressor unit driven by the exhaust gases from the engine. It relates also to such plants and to the methods for operating them.

Already known are power plants of the above-described type which comprise a permanently open conduit means connecting the compressor and the turbine of the unit, enabling direct and permanent passage of a flow of by-passed air to the turbine, the auxiliary combustion chamber being arranged upstream of the turbine (French Pat. No. 70 25074 corresponding to U.S. Pat. No. 3,736,752).

The auxiliary combustion chamber comprises fuel injection means and openings formed in the wall of the chamber which permit the inflow of combustion supporting gas which is constituted only by by-passed air, or by a mixture of by-passed air and exhaust gases from the engine, or at the same time by by-passed air and exhaust gases from the engine.

In such a plant, the flow-rate of fuel injected into the combustion chamber varies within wide proportions according to the operating rate of the plant. The chamber operates for example at full power (maximum fuel flow-rate) under certain conditions, when the engine operates for example at idling speed; on the other hand, it operates at a reduced power (minimum fuel flow-rate) when the engine is under load; in this case, the combustion chamber is kept at pilot-rate operation to avoid the necessity of the subsequent re-ignition instead of becoming extinguished.

On the operation of the combustion chamber at pilot-rate, the flow-rate of fuel introduced can be very low, in certain cases even below about 2% of the fuel flow-rate injected during operation of the chamber at full power.

The problem hence consists of providing a combustion chamber, and notably a device for the injection and spraying of the fuel, which permits considerable variations in the fuel flow-rate, which variations may reach proportions of 1 to 50 or even from 1 to 60.

It must be noted in passing that such an auxiliary chamber operates very differently from that of the combustion chamber of a gas turbine power plant in which the thermal power of the chamber is an increasing function of the power supplied by the plant, whilst in the above-defined plant it is when the engine operates at idling speed that the flow-rate is at a maximum.

Known are devices for injection and mechanical spraying, that is to say in which the liquid fuel is sprayed into the chamber by injecting it at a sufficiently high pressure through a calibrated orifice of small cross-section. However the laws of similitude which permit the calibration of mechanical spraying systems cannot be extrapolated to very low flow-rates; for these very low flow-rates (which can be of the order of some liters per hour), the diameter of the orifices through which the spraying would have to be effected, would have a value equal or even less than the filtration threshold which, of course, would risk frequent clogging of these spraying orifices.

Moreover, if the fuel had to be injected into the combustion chamber through a purely mechanical spraying system, the injection pressure through the orifice would have to vary substantially as the square of the injected flow-rate. In the case where the injected flow-rate must vary within proportions of 1 to 60, the necessary pressure to obtain correct spraying would vary in proportions from 1 to 3600.

Independently of the problems encountered in the use of pressure varying in such proportions, it would be necessary, to obtain correct spraying at all speeds of the engine, that the orifice should be calibrated taking into account the smallest flow-rate and a minimum pressure below which it would be difficult to drop, since the spraying would run the risk of being defective, and "tear-formation" would be observed.

By way of example and for a combustion chamber of a supercharging system for a Diesel engine of about 3000 HP, the minimum fuel flow-rate to maintain pilot-rate operation of the combustion chamber is about 2 liters/hour. In order to have mechanical spraying, this flow-rate should be injected at a relative pressure of 0.8 bar (with respect to the static pressure existing in the chamber). The maximum fuel flow-rate for starting-up the stationary engine turbocompressor unit and the operation of the engine at idling speed can reach about 120 liters/hour; this flow-rate would then have to be injected at a relative pressure of 3000 bars, obviously a condition which is not acceptable.

Moreover, and if reference is again made to the example given above, the calibration of the orifice through which the fuel would have to be introduced would correspond to a diameter of 0.2 mm. Such an orifice is then very easily clogged by impurities and very easily fouled by combustion residues.

To avoid the above-mentioned drawbacks, various solutions have been proposed for injecting fuel into the combustion chamber, notably solutions calling upon mechanical spraying through several orifices coming successively into action according to the flow-rate of fuel to be injected.

However, such solutions are relatively complex to put into practice and they lend themselves poorly to continuous variation of the flow-rate of fuel injected into the chamber.

It is an object of the invention to provide a combustion chamber useful notably in a supercharging system for an internal combustion engine, which avoids the above-mentioned difficulties, by enabling the production of satisfactory spraying at all fuel flow-rates without however requiring injection orifices of too small a diameter and, correspondingly, supply pressures which are too high at high flow-rates, or orifices brought into action in varying number.

To this end, the invention provides a combustion chamber provided with a fuel injection and spraying device and means for the introduction of combustion supporting gas for a supercharging system for an internal combustion engine, notably a Diesel engine, said system comprising: a turbocompressor, passage means connecting the compressor to the turbine and enabling the direct and permanent passage of a flow of by-passed air to the turbine, and said combustion chamber being arranged upstream of the turbine, characterised by the fact that the fuel injection device comprises:

at least one injection port opening into the chamber and supplied by delivery means for fuel under pressure at a flow-rate which can vary between a maximum value and a minimum value, said injection port being of such cross-section that the maximum flow-rate of fuel, corresponding to full power of the combustion chamber, is mechanically sprayed but that mechanical spraying does not take place at minimum flow-rate;

and at least one blower nozzle opening into the chamber in the vicinity of the injection port, supplied permanently by means for delivering air under pressure, said means and said nozzle being provided so that the speed and flow-rate of the air blown in through the nozzle ensure the pneumatic spraying of the fuel when the flow-rate of the latter is too low for the injection port to ensure satisfactory mechanical spraying.

It will be seen that, in such a chamber, the injection device enables:

operation in the vicinity of maximum power, the delivered fuel being sprayed mechanically at the outlet of the injection port using a pump which may be of a type only providing moderate pressure (some tens of bars for example), whilst the flow of air delivered through the one or more blower nozzles has practically no effect on this mechanical spraying, an intermediate operation, the delivered fuel being sprayed at the same time mechanically at the outlet of the injection port, and pneumatically by the effect of the one or more air flows delivered through the one or more blower nozzles, and a pilot-rate operation, the delivered fuel being sprayed pneumatically by the effect of the one or more air flows delivered through the one or more blower nozzles, the flow-rate of air delivered through this one or more blower nozzles being sufficient to ensure, by itself, the complete and stable combustion of the minimum flow of fuel corresponding to this pilot-rate operation.

The invention also provides a method of operating a power plant comprising an internal combustion engine, notably a Diesel engine, and a supercharging system for this engine comprising a turbocompressor, a by-pass passage connecting the compressor to the turbine and enabling the direct and permanent passage of a flow of by-passed air to the turbine, and a combustion chamber provided with a fuel injection device and means for introducing diluting gas, the flow-rate of fuel injected into the chamber varying in a high proportion, which can exceed 50, from a minimum value, notably on operation of the power plant at its nominal power, to a maximum value, notably on operation at idling speed, characterised in that the fuel is injected under pressure into the chamber through at least one injection port whose cross-section is sufficiently small for said maximum flow-rate to be mechanically sprayed and too large for the minimum flow-rate to be mechanically sprayed, and in that air is blown in permanently, which air can be drawn from said compressor, into the chamber in the vicinity of the outlet of the injection port with a speed, a delivery rate and an orientation such that the pneumatic spraying of the fuel is ensured at low flow-rates and at the minimum flow-rate for which the injection port does not ensure mechanical spraying.

The invention enables:

the mechanical injection and spraying of the maximum flow-rate of fuel for which the combustion chamber is designed, and the correct combustion of this maximum flow-rate of fuel, by arranging the combustion along three conventional zones, namely the primary combustion zone, the intermediate combustion zone and the dilution zone, the pneumatic injection and spraying (that is to say by the interaction of the fuel jet with the one or more gas jets) of the minimum fuel flow-rate for which the combustion chamber is designed (pilot-rate flow), and the burning of this sprayed fuel in the air which has served for spraying it, this air being introduced at a sufficient delivery rate for the mixture thus formed on combustion at pilot-rate to be within the proportions sufficiently close to the stoechiometric proportion for combustion to be complete, stable and insensitive to possible acoustic disturbances generated by the engine, notably at the time of sudden changes in engine speed, this pilot-rate combustion being capable of enabling rapid return to the conditions of full power operation of the chamber, the variation, in a continuous manner, of the flow-rate of fuel between its maximum value and its minimum value, the transition between these two types of operation at full power and at pilot rate occurring whilst preserving correct, complete and stable combustion of the flow-rate of injected fuel, this transition being made possible by the fact that the delivery rate of air blown in to spray pneumatically the minimum flow-rate of fuel is maintained constantly, the influence of the mechanical spraying being reduced progressively as the influence of the pneumatic spraying becomes preponderant and conversely.

The invention provides also additional advantages: constant cooling of the injector in which the injection orifice is formed, is provided which avoids the formation of tar or coke in the vicinity of said orifice. Possible deposits of soot or impurities in the vicinity of the injection port are removed by the one or more air flows delivered through the one or more blower nozzles, and said port thus remains clean.

The diameter of the injection port being determined for the maximum flow-rate of fuel, the risk of accidental clogging of said port is distinctly reduced. In practice there is no risk of fouling or clogging the one or more blower nozzles, permanently supplied with fresh air.

The air supplying the one or more blower nozzles of the injection device is advantageously constituted by supercharging air from the engine, drawn off at a point of the supercharging system where the pressure is sufficiently high (pressure greater than the static pressure existing in the combustion chamber) so that the flow-rate and speed of the air delivered through the one or more blower nozzles are sufficient to ensure the pneumatic spraying of the fuel during pilot-rate operation; preferably, this air is drawn off downstream of the cooler provided before the super-charging air intake in the engine.

To obtain optimal efficiency of the one or more air flows delivered through the one or more blower nozzles, the blower nozzles are advantageously substantially perpendicular to the axis of the injection port; to improve further this efficiency, the blower nozzles are arranged so that they are oriented tangentially with respect to the injection port of circular shape, which permits a suitable angle to be given to the spraying cone and the turbulence in the combustion zone to be increased and this contributes again to improving the flame stability on operation at pilot-rate of the chamber.

The invention will in any case be well-understood by referring to the description below of one embodiment of the invention, given by way of non-limiting example.

The description refers to the accompanying drawings, in which.

Figure 1:
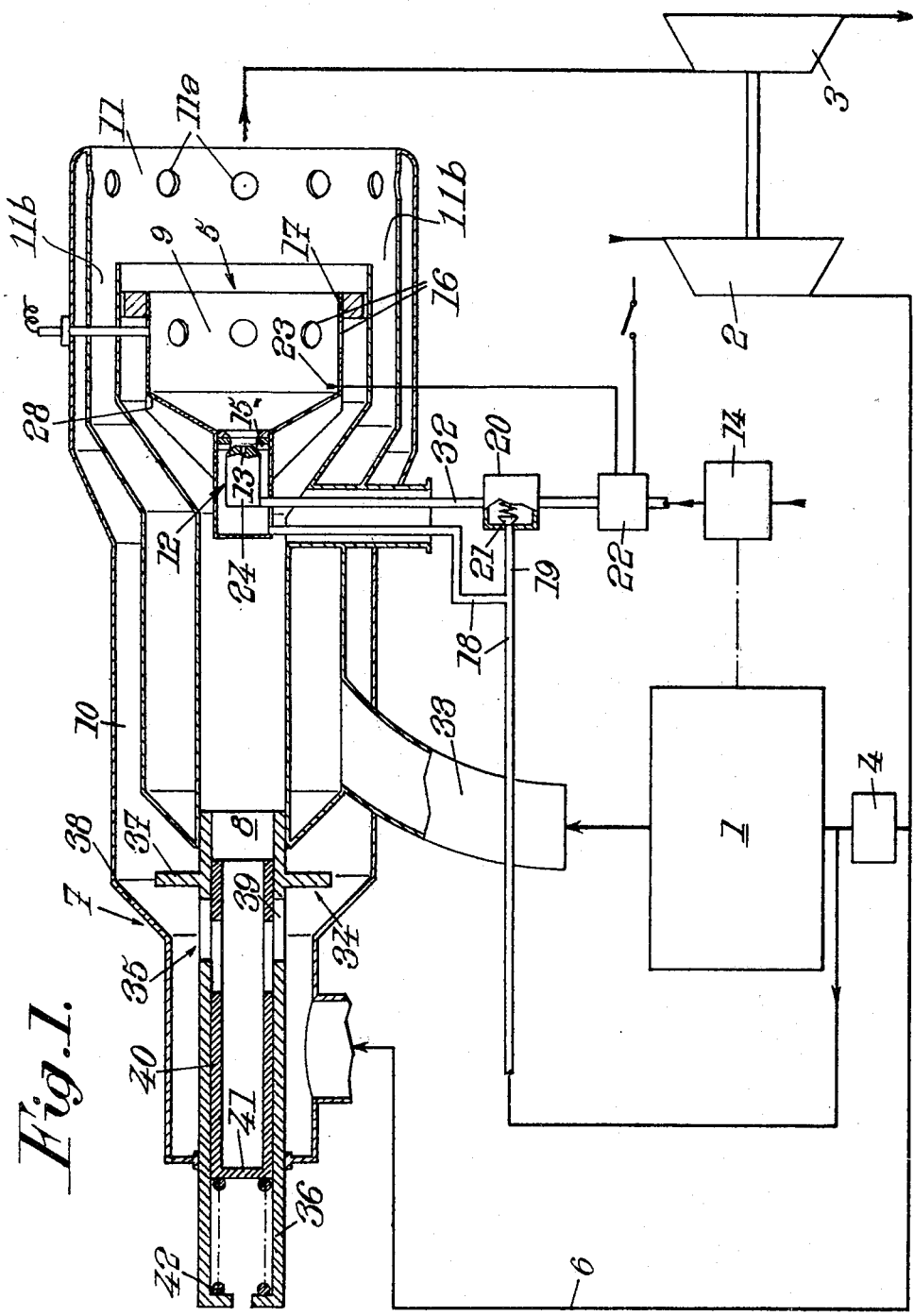
FIG. 1 is a simplified view of a combustion chamber according to the invention and forming part of a Diesel engine power plant whose main components are shown in diagrammatic manner.

In FIG. 1, is shown a power plant comprising a Diesel engine 1 and its supercharging system. This supercharging system comprises a turbocompressor unit. The unit shown includes a single compressor 2 driven by a single turbine 3. However several units may obviously be grouped in cascade and the turbine, like the compressor, may have several stages.

The air emerging from the compressor 2 is directed, on the one hand, to the Diesel engine 1 through a cooler 4 and, on the other hand, to an auxiliary combustion chamber 5 through a by-pass passage 6 permanently open and of sufficient section to bring to the chamber all the air supplied by the compressor and not consumed by the engine, on arrest and at all speeds of the latter. The combustion chamber 5 receives, in addition to fresh air coming from the compressor 2, liquid fuel through a fuel injection device 12 and exhaust gases from the Diesel engine 1 through a passage 33. Its outlet is connected to the turbine 3 which receives therefore exhaust gases from the Diesel engine and combustion gases from the chamber.

In the embodiment illustrated in FIG. 1, the fresh air arriving at the chamber is divided by a regulator device 7 of the type described in French certificate of addition application No. 73 10041 corresponding to U.S. Ser. No. 345,968, filed Mar. 29, 1973, now abandoned in favor of U.S. continuation-in-part application Ser. No. 437,748, filed Jan. 29, 1974 on the one hand, into primary air 8 which is introduced into a primary zone 9 of the chamber 5 and on the other hand, into secondary air 10 introduced via openings 11a into a dilution zone 11 of the combustion chamber 5, which zone is located downstream of the primary zone 9. The exhaust gases arriving through passage 33 are introduced through an annular outlet 11b into the dilution zone 11, in an arrangement comparable with that described in French patent No. 72 12112 and in the corresponding U.S. Pat. No. 3,849,988.

Figure 4:
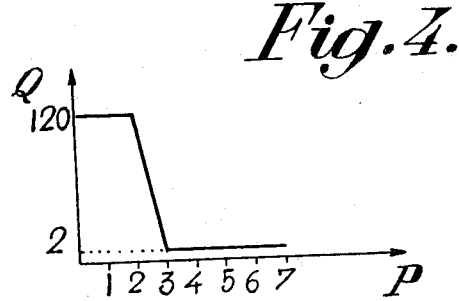
FIG. 4 is a graph showing the variation of the fuel flow-rate Q injected into this combustion chamber as a function of the supercharging pressure P.

Before describing the device 12 for the injection and spraying of fuel in the primary zone of the combustion chamber 5, bounded by a flame tube 17, reference will be made to the graph of FIG. 4 which shows the variation in flow-rate of fuel Q (in l/h) injected into the combustion chamber of a plant taken by way of example, as a function of the supercharging pressure P (expressed in bars).

To start up the turbocompressor unit whilst the engine 1 is stopped, and until the pressure supplied by this unit reaches 2 bars, the combustion chamber is supplied by a maximum flow-rate of fuel (120 l/h). When this pressure of 2 bars is reached, and until it increases up to 3 bars (whilst the energy delivered to the turbine by the exhaust gases from the engine increases at the same time as the power of the engine increases from 0 to about 20 to 30% of the maximum power of the latter), the combustion chamber is supplied by a flow-rate of fuel decreasing regularly from 120 l/h to about 2 l/h.

Then, starting from a supercharging pressure P of 3 bars, the combustion chamber is put into pilot operation and supplied by a minimum flow-rate of fuel (2 l/h). It is hence seen that the flow-rate of fuel varies within a ratio of 1 to 60.

The injection device 12, provided to ensure sufficient spraying throughout the whole range of variation of the flow-rate, comprises essentially fuel injection means and air delivery means which will be described in turn. It is essential to note well that the air blower means designed to spray the fuel at low flow-rates have nothing to do with the delivery means for the combustion air necessary for the high thermal power of the chamber and of the dilution gases, but fulfill an entirely different role, as will besides be seen below.

In the embodiment illustrated, a single fuel injection port 13 is provided, formed in the axis of the flame tube 17. This port is formed in an injector 24 provided with an injection passage 32 for fuel from supply means comprising a pump 14 of adjustable delivery rate.

The port 13, of circular shape in the embodiment illustrated, has a cross-section selected to meet the following conditions:

on the one hand, this port 13 has a sufficiently small diameter to spray the fuel mechanically when the maximum flow-rate of the latter is introduced into the chamber through this orifice, on the other hand, this diameter is selected at a larger value than that which would enable mechanical spraying of the fuel to be preserved when the flow-rate of the latter is a minimum, sufficiently great for moderate pressure (of some tens of bars) to be sufficient to inject the maximum flow-rate through the port.

The fuel supply means must obviously be capable of supplying it at a pressure such that the maximum flow-rate is injected into the chamber through the port when this flow-rate is necessary. This pressure is obviously much below that which it could provide if the port had been given a sufficiently small value to preserve mechanical spraying at low flow-rates.

These two conditions fix in practice a maximum value and a minimum value of the cross-section of the port. In the range thus defined a value of the cross-section which will depend on the pressure which the available pump can supply and on the necessity of remaining above the cross-section which corresponds to the fuel filtration threshold, will be employed.

The injection port 13 is generally arranged to spray the fuel mechanically into a hollow or solid cone, of 60° to 90° aperture according to circumstances; the internal geometry of this injection port 13 enables the rotation of the fuel, according to a feature known in itself used, for example, in central heating injectors sold by the DANFOSS Company.

Figure 2:
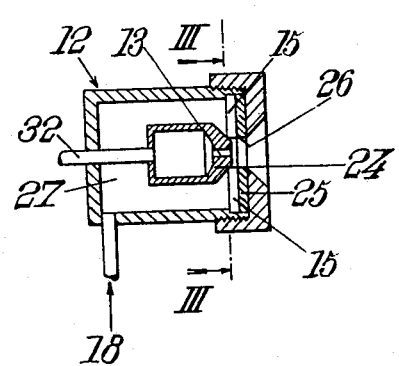
FIG. 2 is an enlarged view of the fuel injection means in this combustion chamber.
Figure 3:
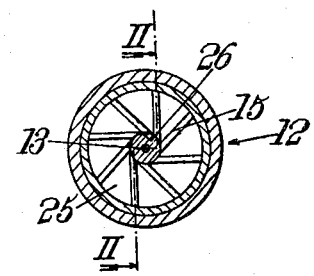
FIG. 3 is a section along the line III—III of FIG. 2.

The air blower means comprise at least one nozzle 15 supplied permanently by air at a pressure above the static pressure existing in the combustion chamber 5. In the embodiment illustrated by way of example, several blower nozzles 15 are provided (FIGS. 2 and 3). The one or more nozzles open into the combustion chamber in the vicinity of the injection port and are oriented to supply air jets substantially perpendicular to the axis of the injector 24. They are connected to an air supply system, the nozzles and the supply system being provided so that the air jets have a speed and a delivery rate such that they spray the fuel injection pneumatically at low flow-rates and at minimum flow-rate of the latter, for which the injection port could not ensure mechanical spraying. Moreover, the flow-rate of air is selected so that it ensures complete and stable combustion of the fuel when the flow-rate of the latter is a minimum or close to the minimum.

Again in the embodiment illustrated in FIGS. 2 and 3, the air blower means comprise, around the central injector 24, a cylindrical space 27 supplied through the passage 18 and coaxial with the injector. This space carries a circular part, or disc 25 placed in front of the injection port and pierced by a central aperture 26 of diameter greater than the diameter of the injection port 13, sufficient so that in mechanical spraying the jet does not interfere with the walls of the aperture. The circular part 25 is supported on the front surface, of conical shape, of the injector 24. The blower nozzles 15 are arranged in this circular part 25 in the form of grooves machined in the surface which is supported on the central injector 24. The blower nozzles 15 are advantageously oriented tangentially with respect to the periphery of the injection device 13, as is seen in FIG. 3. The efficiency of the air flows delivered through the blower nozzles 15 is thus increased, thereby improving the turbulence in the combustion zone. In particular, and on operation by "pneumatic spraying" better stability of the flame is achieved by centrifugation of the air-fuel mixture. This centrifugation enables a suitable value to be given to the angle of the spray cone, in pneumatic spraying operation, as will be seen below.

The air which supplies the blower nozzles 15 of the injection device 12 is advantageously engine supercharging air. In the embodiment illustrated, a passage 18 connects the blower nozzles 15 to a part of the supercharging air circuit where the latter has already traversed the cooler 4, that is to say just before its intake into the engine 1.

This air, compressed and cold, can act, through a passage 19, on a pneumatic member 20 (FIG. 1) to actuate a valve 21 mounted in the fuel circuit between the pump 14 and the injection device 12. This pneumatic member 20 automatically removes fuel in the injection device 12, as soon as the supply pressure of the fuel is no longer generated: decomposition of the fuel remaining in the delivery passage when the fuel supply of the chamber is stopped and the engine continues to operate (coking, tar formation) is thus avoided.

The device of FIG. 1 includes also, upstream of the pneumatic member 20, an electrovalve 22 energised on ignition of the combustion chamber 5 and controlled by a thermosensitive element 23 arranged in the combustion zone 9. This thermosensitive element 23 cuts off the intake of fuel in the case of accidental dousing of the combustion chamber 5. The control can also be manual; thus, the combustion chamber can be extinguished at will.

The regulator 7, intended, on the one hand, to regulate automatically the pressure drop undergone by the fresh air passing from the compressor 2 to the combustion chamber 5 through the by-pass passage 6, on the other hand, to distribute this fresh air into primary air and secondary air, can for example have the constitution illustrated in FIG. 1, close to that described in the aforesaid French patent application 73 10041.

This regulator 7 may be regarded as comprising:

first throttle means 34 with variable passage cross-section, arranged so as to be traversed by secondary air 10, these first throttle means 34 generating, between the upstream part of the by-pass passage 6, connected to the compressor 2 and the downstream part connected to the combustion chamber 5, a pressure difference $\Delta p$ which is an increasing function (advantageously almost linear) of the pressure P which exists in the upstream part of the passage 6;

and second throttle means 35, with passage cross-section also automatically variable, subject to the pressure difference $\Delta p$ and arranged so as to be traversed by the primary air, these second throttle means 35 offering to the primary air a passage cross-section which is determined by the pressure $P - \Delta p$, according to a preset relationship.

In the embodiment illustrated, the first throttle means are constituted by a cylinder 36 provided with an annular throttle valve 37 which cooperates with a fixed seat constituted by a frustoconic wall of the casing 38 of the regulator. The second throttle means 35 are constituted by ports 39 formed in the cylinder 36 and by a tubular slide 40 sliding on the cylinder and more or less closing the ports 39 according to its position on the cylinder. This slide 40 comprises a bottom 41 so as to form a piston: it is seen that it is subject to two forces of opposite directions, constituted one by the compression of a spring 42 (whose action tends to move the slide in the direction of opening the ports 39), the other by the pressure $P - \Delta p$ which exists downstream of the ports.

Fresh air arriving at the regulator 7 through the by-pass passage 6 is thus divided automatically into primary air 8 and secondary air 10, the ratio of the flows being fixed by the passage cross-section offered to the primary air.

Under these conditions, it is seen that on operation at full power of the chamber 5, although the flow-rate of fuel is sufficient for mechanical spraying to occur — the supercharging pressure P is relatively low. Consequently the pressure of air supplying the blower nozzles is hardly greater than the static pressure which exists in the chamber. On the other hand, when the chamber 5 operates at pilot-rate, although the supercharging pressure obtained due to the simple fact of driving the turbine 3 by the exhaust gases from the engine 1 is sufficient, the supercharging pressure P is high as well as the pressure drop $\Delta p$ imposed by the regulator 7: under these conditions, the pressure difference between the air supplying the blower nozzles and the static pressure of the chamber is distinctly increased and can reach 5 to 20% of the static pressure, the corresponding air flow-rate permits pneumatic spraying to be ensured.

The number and cross-section of the nozzles 15 are provided so that at this speed of operation the mixture of air and of fuel close to the injection device is sufficiently close to the conditions of stoechiometric mixture for combustion to be complete and stable.

The operation of a combustion chamber equipped with such an injection device and provided with an orifice 13 of 0.7 mm diameter as well as with eight nozzles of 12 mm$^2$ overall cross-section, is then as follows, still referring to the example of its application indicated above.

1. from 120 liters/hour to 25 liters/hour, the fuel is mechanically sprayed at the outlet of the injection port 13, the pressure of the fuel upstream of the port 13 passing from 20 relative bars (for 120 liters/hour) to 0.8 relative bar (for 25 liters/hour): under these conditions of operation, the speed of air flows delivered through the blower nozzles 15 is insufficient, with respect to those of the droplets of sprayed fuel, to have an appreciable effect on said droplets. The arrangement of combustion with a purely mechanical spraying is illustrated in FIG. 5: the combustion is stabilised by holes 16 formed around the primary zone 9, substantially at the intersection of the flame tube 17 and of the fuel cone.

Figure 6:
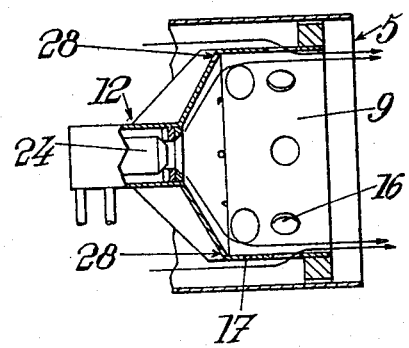
FIG. 6 is a sectional view of the combustion chamber showing how combustion is arranged on pilot-rate operation of the chamber.

2. from 10 liters/hour to 2 liters/hour, the flow of fuel is pneumatically sprayed by the effect of the air flows delivered through the blower nozzles 15: under these conditions of operation, the speed of passage of the fuel in the injection port 13 is negligible with respect to the speed of the air flows delivered through the blower nozzles 15. The organisation of combustion on operation with a purely pneumatic spraying is illustrated in FIG. 6: the flow of fuel is also very low and the introduction of this air through the holes 16 would not affect the fuel which must hence be burnt with the air delivered through the blower nozzles 15 of the injection device. As has been seen above, the flow of this air is selected so that the air-fuel mixture is sufficiently close to the conditions of stoechiometric mixture for this combustion to be complete and stable, 3. from 25 liters/hour to about 10 liters/hour, the fuel is sprayed both mechanically at the outlet of the injection port 13 and pneumatically by the effect of the air flows delivered through the blower nozzles 15: under these conditions of operation, the speed of the droplets of mechanically sprayed fuel is sufficiently low for the speed of the flows of air delivered through the blower nozzles to have an effect on the droplets.

Figure 5:
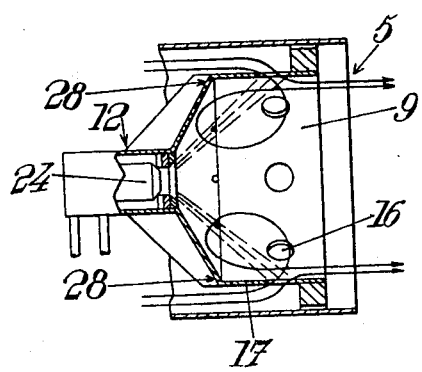
FIG. 5 is a sectional view of the combustion chamber showing how the combustion is arranged on operation at full power of the chamber.

With mixed spraying (mechanical and pneumatic) the organisation of combustion develops between the two configurations illustrated in FIGS. 5 and 6. When the supercharging pressure diminishes and there is a change from "pneumatic spraying" to "mixed spraying" operation, the space occupied by the flame increases. When a considerable flow of air starts to penetrate through the holes 16, the flame tends to "become attached" around a toric recycling zone.

Operation with mixed spraying is further improved by arranging at the rear part of the combustion chamber openings 28, supplied with primary air, opening along the lateral wall of said chamber, said openings being pierced preferably along axes which, on the one hand are situated in planes parallel to the axis of the chamber and, on the other hand, form an angle with the axis of the chamber. In this way, it is possible to supply the primary combustion zone of the chamber with a rotating layer of air, parallel to the axis of the latter. This layer of air ensures, on the one hand cooling of the lateral wall of the chamber and, on the other hand, contributes to avoiding the formation of soot and coke, principally on operation at intermediate rates, that is to say with mixed spraying.

We claim:

1. In a supercharged internal combustion engine of the expansible chamber type comprising a turbocompressor with at least one compressor and at least one turbine for driving said compressor, said engine having a combustion chamber system connected between said compressor and said turbine, a bypass pipe communicating with the outlet of said compressor and with the turbine inlet such that said bypass pipe is in parallel air flow relation with said engine combustion chamber system, said bypass pipe being adapted and dimensioned for direct passage to the turbine of that part of the air flow delivered by the compressor which is not drawn into said engine combustion chamber, an auxiliary combustion chamber operable for reheating gases upstream of said turbine, said auxiliary combustion chamber being supplied with liquid fuel and at the same time be exhaust gases emerging from said engine combustion chamber system and by fresh air taken through said bypass pipe, said auxiliary combustion chamber comprising a tubular element having a closed end and an open end, a primary air intake conduit communicating with said bypass pipe and having an outlet arranged to introduce fresh air into the tubular element in a combustion zone in the vicinity of its closed end, an exhaust gas intake conduit communicating with the exhaust outlet of said engine combustion chamber system and having an outlet arranged to introduce the exhaust gases into the tubular element in the neighborhood of its open end at a mixing zone located downstream of said combustion zone wherein the primary air, or the products of combustion thereof with the fuel, first meet the exhaust gases, said exhaust gas conduit outlet being oriented to effect said introduction with minimum load loss and in the direction of the open end of said tubular element, and a secondary air intake conduit communicating with said bypass pipe and having an outlet arranged to introduce fresh air into the tubular element downstream of the upstream end of said mixing zone, said secondary air conduit outlet being arranged to introduce fresh air oriented in a direction transverse to the flow of the exhaust gases in said mixing zone such that the flow of secondary air into said mixing zone is opposed by the flow of the exhaust gases in said mixing zone, the combination therewith of an improved fuel injection and spraying means comprising:

liquid fuel injection port means of constant fixed orifice size and located toward the closed end of said tubular element and oriented for discharging fuel into said combustion zone solely from a given entry zone, means for delivering pressurized liquid fuel to said port means at a rate and pressure adjustable from a minimum value to a maximum value to thereby vary the quantity of fuel discharged into said chamber via said port means, said fixed orifice size of said port means being selected small enough for spray atomization of the fuel to the mechanically achieved at said maximum rate solely by hydraulic atomization resulting from discharge of liquid fuel under pressure via said port means into said combustion zone and large enough so that the fuel is not so mechanically atomized at said minimum rate, air passage means opening into said tubular element at a location close to said port means and oriented to direct an impinging jet air flow against the fuel spray discharged from said port means as the same enters said combustion zone, and means for permanently delivering spraying air to said air passage means at a speed and at a rate sufficient for the air jet flow from the air passage means to pneumatically atomize the fuel efficiently for the minimum flow rate during operation of said auxiliary combustion chamber.

2. The combination as set forth in claim 1 wherein said primary air intake conduit defines a primary space surrounding the closed end of the tubular element, said tubular element having orifice means for admitting primary air form said primary space into said combustion zone.

3. The combination as set forth in claim 2 wherein said exhaust gas intake conduit defines a space of annular shape intermediate said primary space and said secondary air conduit and wherein said exhaust conduit outlet is connected to the tubular element downstream of the primary space.

4. The combination as set forth in claim 3, wherein said injection port means comprises a single port for generating at said maximum rate and pressure a generally conical spray pattern in said combustion zone, and said air passage means comprises a plurality of air passages located transversely to the axis of said spray pattern generated by hydraulic atomization effected via said fuel injection port.

5. The combination as set forth in claim 4, wherein said air passages are located substantially tangentially with respect to the periphery of said injection port.

6. The combination as set forth in claim 3, including conduit means for communicating part of the air delivered by the compressor to said air passage means.

7. The combination as set forth in claim 6, wherein air cooling means are located between said compressor and the inlet of said engine combustion chamber and said conduit means are connected for diverting air to said air passage means which has circulated through said air cooling means.

8. The combination as set forth in claim 4, wherin said fuel injection and spraying means comprises an injector located along the axis of said combustion zone and formed with said port, a part defining an air chamber around said injector, a disk closing said air chamber and formed with an axial opening whose diameter is larger than the diameter of said spray pattern generated via said injection port at the point where said pattern passes through said axial opening of said disk, said disk being oriented transverse to the axis of said injector port downstream thereof and abutting a front end surface of said air chamber, said air passages being formed as slots cut in the surface of said disk adjacent said injector port, said air delivery means being connected to said air chamber.

9. In a combustion chamber for a turbocompressor unit associated with an internal combustion engine operable for reheating gases upstream of the turbine of said turbocompressor unit, said combustion chamber being adapted to be supplied with fuel and at the same time by exhaust gases emerging from the engine and by fresh air taken through a bypass pipe connected between the outlet of the compressor and the inlet of said turbine of said turbocompressor unit in bypass relation to the engine, said combustion chamber comprising a tubular element having a closed end and an open end, at least one fuel injector located toward the closed end of the tubular element, a primary air intake conduit adapted to communicate with said bypass pipe and having an outlet arranged to introduce fresh air into the tubular element in a combustion zone in the vicinity of its closed end, an exhaust gas intake conduit adapted to communicate with the exhuast outlet of the engine and having an outlet arranged to introduce the exhaust gases into the tubular element in the neighborhood of its open end at a mixing zone located downstream of said combustion zone wherein the primary air, or the products of combustion thereof with the fuel, first meet the exhaust gases, said exhaust gas conduit outlet being oriented to effect said introduction with minimum load loss and in the direction of the open end of said tubular element, and a secondary air intake conduit adapted to communicate with said bypass pipe and having an outlet arranged to introduce fresh air into the tubular element downstream of the upstream end of said mixing zone, said secondary air conduit outlet being arranged to introduce fresh air oriented in a direction transverse to the flow of the exhaust gases in said mixing zone such that the flow of secondary air into said mixing zone is opposed by the flow of the exhaust gases in said mixing zone, the combination therewith of means for injecting liquid fuel into said combustion zone at a flow rate adjustable from a minimum value to a maximum value through said fuel injector, said fuel injector having injection port means of such size that the fuel is mechanically atomized when injected at said maximum rate and is no longer atomized when injected at the minimum rate, and means for permanently blowing spraying air into said combustion zone close to the fuel injection port means at a rate and a speed sufficient for such air to pneumatically atomize the fuel when the flow rate of said fuel is so low that mechanical atomizing is not achieved, particularly during on-load operation of the engine.

10. The combination as set forth in claim 9, wherein said spraying air blowing means is operable to inject the atomizing air at a sufficient rate for complete and stable combustion of the fuel when the latter is injected at a rate too low for mechanical atomization to be achieved.

11. The combination as set forth in claim 10, wherein said spraying air blowing means is operable to inject said atomizing air under a pressure which is five to twenty percent higher than the static pressure which prevails in the combustion zone at low fuel injection rates.

12. The combination as set forth in claim 10, wherein said spraying air blowing means comprises a conduit operably connected to divert air from the output of said compressor.

13. The combustion chamber as set forth in claim 9, wherein said primary air intake conduit defines a primary space surrounding the closed end of the tubular element, said tubular element having a plurality of orifices distributed regularly over its circumference for admitting primary air from said primary space into said combustion zone.

14. The combustion chamber as set forth in claim 13, wherein said exhaust gas intake conduit defines a space of annular shape intermediate said primary space and said secondary air conduit and wherein said exhaust conduit outlet is connected to the tubular element downstream of the primary space.

15. The combination as set forth in claim 14 wherein said injection port means comprises a single port for generating at said maximum rate and pressure a generally conical spray pattern in said combustion zone, and said air passage means comprises plurality of air passages located transversely to the axis of said spray pattern generated by hydraulic atomization effected via said fuel injection port.

16. The combination as set forth in claim 15, wherein said air passages are located substantially tangentially with respect to the periphery of said injection port.

17. The combination as set forth in claim 14, including conduit means for communicating part of the air delivered by the compressor to said air passage means.

18. The combination as set forth in claim 17, wherein air cooling means are located between said compressor and the inlet of said engine combustion chamber and said conduit means are connected for diverting air to said air passage means which has circulated through said air cooling means.

19. The combination as set forth in claim 15, wherein said fuel injection and spraying means comprises an injector located along the axis of said combustion zone and formed with said port, a part defining an air chamber around said injector, a disk closing said air chamber and formed with an axial opening whose diameter is larger than the diameter of said spray pattern generated via said injection port at the point where said pattern passes through said axial opening of said disk, said disk being oriented transverse to the axis of said injector port downstream thereof and abutting a front end surface of said air chamber, said air passages being formed as slots cut in the surface of said disk adjacent said injector port, said air delivery means being connected to said air chamber.

20. In a supercharged internal combustion engine comprising a turbocompressor unit with at least one compressor and at least one turbine, a bypass pipe having an upstream part and a downstream part, said bypass pipe providing direct passage to said turbine of that part of the air flow delivered by the compressor not drawn into said engine, and throttle means with a variable passage cross section and arranged so as to be traversed by the air passing through the bypass pipe for generating between the upstream and downstream parts of the bypass pipe a pressure difference which is an increasing function of the pressure existing in the upstream part, said pressure difference being approximately independent of the flow rate of air traversing said throttle means, said turbocompressor unit also including an auxiliary combustion chamber arranged upstream of said turbine and supplied by exhaust gases issuing from said engine and by air which has passed from said compressor through said bypass pipe, said combustion chamber having a primary air intake operably connected to said bypass pipe to introduce air from said bypass pipe into a combustion zone of said combustion chamber, and a secondary air intake operably connected to said bypass pipe to introduce air from said bypass pipe into a mixing zone disposed in said combustion chamber downstream of said combustion zone, said throttle means comprising, in parallel, first throttle means with variable passage cross section arranged so as to be traversed by the secondary air, said first throttle means generating between the upstream part of the bypass pipe and the downstream part of said bypass pipe a pressure existing in said upstream part, and second throttle means with variable passage cross section subject to the difference in pressure generated by said first throttle means and arranged so as to be traversed by the primary air, said second throttle means regulating the primary air flow by offering a passage cross section to this primary air which is servocoupled to the pressure existing in the downstream part or in the upstream part of the bypass pipe, said servocoupling following a predetermined relationship, the combination therewith of means for injecting liquid fuel into said combustion zone at a flow rate adjustable from a minimum value to a maximum value via a fuel injector, said fuel injector having injection port means of such size that the fuel is mechanically atomized when injected at said maximum rate and is no longer atomized when injected at the minimum rate, and means for permanently blowing spraying air into said combustion zone close to the fuel injection port means at a rate and a speed sufficient for such air to pneumatically atomize the fuel when the flow rate of said fuel is so low that mechanical atomizing is not achieved, particularly during on-load operation of the engine.

21. The combination as set forth in claim 20 wherein said spraying air blowing means is operable to inject the atomizing air at a sufficient rate for complete and stable combustion of the fuel when the latter is injected at a rate too low for mechanical atomization to be achieved.

22. The combination as set forth in claim 21, wherein said spraying air blowing means is operable to inject said atomizing air under a pressure which is five to twenty percent higher than the static pressure which prevails in the combustion zone at low fuel injection rates.

23. The combination as set forth in claim 21, wherein said spraying air blowing means comprises a conduit operably connected to the upstream part of said bypass pipe in parallel with said primary and secondary air intakes.

* * * * *